Figure 1:
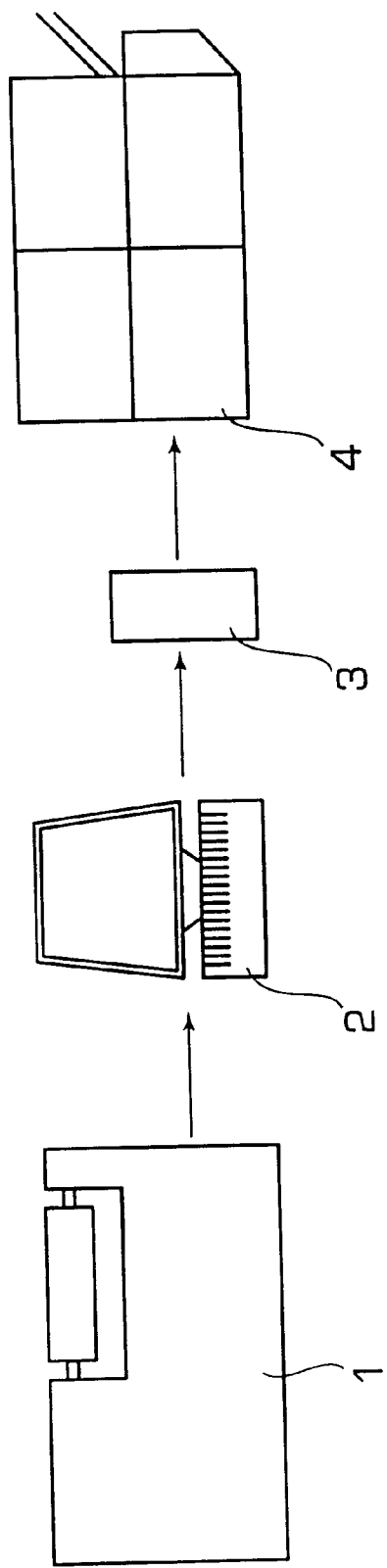

United States Patent [19]
Zimmer

[11] Patent Number: 6,068,692
[45] Date of Patent: May 30, 2000

[54] DECORATED CERAMIC AND GLASS ARTICLES, PROCESS FOR THEIR MANUFACTURE AND CERAMIC DYE COMPOSITIONS FOR CARRYING OUT THE PROCESS

[76] Inventor: Michael Zimmer, Beerenfeldstr. 11, D-66133 Saarbrücken, Germany

[21] Appl. No.: 09/273,563

[22] Filed: Mar. 22, 1999

Related U.S. Application Data

[63] Continuation of application No. 08/804,416, Feb. 20, 1997, Pat. No. 5,948,471, which is a continuation of application No. 08/321,831, Oct. 6, 1994, abandoned.

[30] Foreign Application Priority Data

Oct. 7, 1993 [DE] Germany ............... 43 34 239
Apr. 15, 1994 [DE] Germany ............... 44 13 168

[51] Int. Cl.$^7$ ................................ C04B 14/00
[52] U.S. Cl. ............ 106/426; 106/431; 106/450; 106/461; 106/480; 106/481; 427/218; 428/210; 428/211; 428/542.2; 428/913; 428/914
[58] Field of Search .................. 428/195, 206, 428/210, 211, 542.2, 913, 914; 427/218; 106/426, 431, 450, 461, 480, 481

[56] References Cited

U.S. PATENT DOCUMENTS

| | | | |
|---|---|---|---|
| 4,047,970 | 9/1977 | Morriss et al. ............... | 106/299 |
| 4,201,821 | 5/1980 | Fromson et al. ............... | 420/203 |
| 4,205,996 | 6/1980 | Eppler ............... | 106/302 |
| 4,282,302 | 8/1981 | Makino et al. ............... | 430/107 |
| 4,758,952 | 7/1988 | Harris, Jr. et al. ............... | 364/300 |
| 4,842,613 | 6/1989 | Purser ............... | 8/471 |
| 4,888,230 | 12/1989 | Cutright ............... | 428/195 |
| 4,943,684 | 7/1990 | Kramer ............... | 428/34.4 |
| 5,011,758 | 4/1991 | Detig et al. ............... | 430/100 |
| 5,194,089 | 3/1993 | Speer et al. ............... | 106/426 |
| 5,252,125 | 10/1993 | Speer et al. ............... | 106/450 |
| 5,254,162 | 10/1993 | Speer et al. ............... | 106/419 |
| 5,270,445 | 12/1993 | Hou ............... | 528/502 |
| 5,275,649 | 1/1994 | Linke et al. ............... | 106/451 |
| 5,288,691 | 2/1994 | Vanier et al. ............... | 428/195 |

FOREIGN PATENT DOCUMENTS

| | | |
|---|---|---|
| 71497 | 5/1893 | Germany . |
| 9317156 A1 | 5/1989 | Germany . |
| 4041358 C2 | 12/1990 | Germany . |
| 4108623 A1 | 3/1991 | Germany ............... C09C 1/22 |
| 4041358 C2 | 7/1992 | Germany . |
| 1470695 | 9/1993 | U.S.S.R. . |
| 477978 | 9/1993 | U.S.S.R. . |

OTHER PUBLICATIONS

English–language translation of German Patent DE–40 41 358 C2.

English–language translation of German Patent DE–39 17 156 A1.

Database WPI Section Ch, Week 7451, Derwent Publications Ltd.,London, GB; JPA 035 407; Apr. 2, 1974.

Patent Abstract of Japan, vol. 9, No. 48, p. 388 (1771) Feb. 28, 1985 (JP–A–59 187353).

Patent Abstract of Japan, vol. 7, No. 87. p–190 (1232) Apr. 12, 1983 (JP–A–58 014141).

Patent Abstract of Japan, vol. 12, No. 422, p. 783 (3269) Nov. 8, 1988 (JP–A–63 157167).

*Primary Examiner*—Robert Dawson
*Assistant Examiner*—Jeffrey B. Robertson
*Attorney, Agent, or Firm*—Sughrue, Mion, Zinn, Macpeak & Seas, PLLC

[57] ABSTRACT

The invention relates to a process for manufacturing decorated ceramic and glass articles according to which a ceramic dye composition, including fine particles which comprise ceramic pigments and binding medium resin(s) as well as possible further additives, is applied by means of an electrophotographic reproduction process onto a transfer means, for example paper coated with gum arabic, the transfer means coated with the ceramic dye composition is applied onto the ceramic or glass article, and after removal of the transfer means, the ceramic dye composition is combined with the ceramic or glass article by baking. The invention also includes decorative ceramic or glass articles obtainable by means of the above process and a ceramic dye composition of the type mentioned above.

7 Claims, 1 Drawing Sheet

DECORATED CERAMIC AND GLASS ARTICLES, PROCESS FOR THEIR MANUFACTURE AND CERAMIC DYE COMPOSITIONS FOR CARRYING OUT THE PROCESS

This is a Continuation of application Ser. No. 08/804,416 filed Feb. 20, 1997 now U.S. Pat. No. 5,948,471, which is a Continuation of application Ser. No. 08/321,831 filed Oct. 6, 1994, now abandoned. The disclosure of both applications are incorporated herein by reference.

The invention relates to a process for producing decorated ceramic and glass articles, ceramic and glass articles obtainable by means of this process and ceramic dye compositions for carrying out the process.

In the case of known processes of the type initially mentioned, ceramic colored prints are applied onto a ceramic or glass article by means of the screen printing process and, in rare cases, also by means of the offset printing process.

In the case of the generally used screen printing process, a screen printing pattern must first be produced. For this, the screen of finely meshed textile or wire gauze stretched over the printing frame is covered at the picture-free positions with a pattern cut out of paper, drawn with fatty ink or produced photographically. The ceramic colors are then applied by means of this screen printing pattern onto a transfer means such as paper coated with gum arabic. The transfer means prepared in this manner is then applied onto the ceramic or glass article at the desired position and moistened, on account of which the paper can be removed leaving the colors on the article. Finally, the article is then baked in a known manner, which leads to an amalgamation of the ceramic colors with the article. A lasting print is thus produced on the ceramic or glass article.

The manufacture of the screen printing pattern in the known process involves a lot of effort and is unprofitable for single piece production. Additionally, the printing dye must be applied with the aid of a squeegee manually or in screen printing machines through the open locations of the screen printing pattern onto the printing substance, i.e. the transfer means. The screen printing process is furthermore a wet process in which ceramic dye pigments pasted on with printing oil are used as printing dyes so that relatively large and expensive machines having dryers are required in air-conditioned rooms, and further, in particular in view of the solvents required during the production process, considerable work protection and environmental problems exists. The solvents present in the printing oil evaporate relatively easily so that awkward and expensive work-protecting measures must be taken, and separate filtering units are also required. Additionally, as in the case of the offset printing process, in the screen printing process, several successive printing stages are required for the various colors (for example, cyanogen, magenta, yellow and black), which also leads to very large structural units.

Furthermore, there exists the problem in the case of the known printing processes that the reproducibility of the dyes can no longer be ensured in the case of large scale manufacture, and already after a very small number, i.e. approximately after 100 printing steps, the screen printing pattern must be cleaned.

On the other hand, in the case of the screen printing process, the dissolving power of the applied colored print through the raster of the screen printing pattern is limited. This leads to the printed ceramic or glass article often being unsatisfactory with respect to the smoothness, homogeneity and dissolution of the colored print. Furthermore, several special dyes must often be used in order to be able to produce a desired smoothness.

The object forming the basis of the invention consists in providing a process for producing decorative ceramic and glass articles which overcomes the above-mentioned problems in the printing processes known in the prior art. Further, a decorated ceramic and glass article should be provided which is superior to the known articles in terms of smoothness, quality and dissolution of the decoration (of the print). Finally, a ceramic dye composition should be provided which is suitable for carrying out the above process and for producing the desired decorated ceramic and glass articles.

The solution of the above object (s) consists in a process for manufacturing decorated ceramic and glass articles according to which ceramic dye compositions are applied onto a transfer means, the transfer means coated with the ceramic dye compositions is applied onto the ceramic or glass article, and, after removal of the transfer means, the ceramic dye compositions are combined with the article, the process being characterized in that the ceramic dye compositions include fine particles which respectively comprise ceramic pigments and binding medium resin(s), and are applied by means of an electrophotographic reproduction process (electrocopying process) onto the transfer means.

The ceramic articles decorated according to the inventive process relate in particular to articles formed and baked out of clay or clay mineral-containing mixtures. Further preferred ceramic articles also include articles of special ceramic materials such as the various powder-like materials (such as metal oxides) which are not of a silicate nature. For example, the ceramic articles can be products out of porcelain, earthen-ware, but also of special ceramic substances such as steatite, rutile, cordierite and cermet. The ceramic article can also be provided with a lacquer prior to decoration, or the lacquer can be applied after decorating. Glass articles in terms of the invention include all articles produced from a glass mass or articles with a glass surface. In particular, glass articles are revealed here which consist of simple and combined silicates of sodium, kalium, calcium, magnesium, aluminum, barium, zinc and lead. These types of glass are produced by means of flame-heating methods and the cooled melts consist substantially of silicon dioxide, calcium dioxide and sodium oxide, wherein special types of glass can additionally also include large quantities of boron trioxide, phosphorous pentoxide, barium oxide, kalium oxide, lithium oxide, zirconium oxide or lead oxide. Silicone dioxide, boron oxide and phosphorous pentoxide are the actual glass formers which also form the basis for enamel. Accordingly, enamel articles should also be understood under the term "glass articles".

The ceramic pigments to be used in accordance with the invention are generally temperature-stable materials which can be used to manufacture colored coatings and for fire-proof coloring of ceramic or glass articles. The ceramic pigments within the meaning of the invention are generally ceramic pigments of an inorganic nature with excellent refractability.

For example, compounds of oxides of the transition elements together with each other or with metal oxides of elements of the main groups of the periodic system can be mentioned as ceramic pigments. These compounds are generally structured according to the spinel type. The above-revealed ceramic pigments of the spinel type are, for example, obtained by mixing two bivalent metal oxides (for example $MgO$, $ZnO$, $CoO$, $FeO$) in stoichiometrical relationship with a trivalent metal oxide (for example, $Al_2O_3$, $Cr_2O_3$, $Fe_2O_3$) and by subsequently roasting these mixtures.

Furthermore, for example, colorless compounds such as zirconium silicate, zirconium oxide or tin oxide can be mentioned in the crystal lattice of which coloring ions of the transition metals are included, as, for example, is the case in zirconium vanadium blue, in zirconium praseodymium yellow, in tin vanadium yellow and in zirconium iron pink. Furthermore, inclusion pigments are to be mentioned in the case of which intensive pigments such as cadmium sulphoselenide are enclosed by a colorless but very refractory-stable compound such as zirconium silicate or tin oxide. The above ceramic pigments are generally denoted as compounds of the zirconium silicate type.

According to the inventive process, the ceramic pigments are processed into a ceramic dye composition (toner) which includes the mentioned ceramic pigments and a suitable binding medium resin. This toner includes fine particles which generally respectively include a binding medium resin and a ceramic pigment which is dispersed in the resin. The particles in this case preferably have a size (diameter) of 1 to 50 µm, an average particle size of 5 µm being particularly preferred. The portion of the ceramic pigment in the toner also preferably amounts advantageously to 10 to 70 wt %. The parts are also preferably respectively structured such that a core of ceramic pigments is formed which is surrounded by binding medium resin(s).

The above toner is, for example, manufactured in that the ceramic pigment and the binding medium resin are homogeneously mixed, the obtained mixture is kneaded in the melt, cooled, pulverized and graded to the desired particle size.

The binding medium resins to be used in accordance with the invention must burn without leaving a residue in the subsequent baking process, must also be adjusted in terms of their elasticity such that they can capture the desired quantity of ceramic color pigments, during crushing (pulverizing), the mixture must not break, and they should have a melting temperature preferably of approximately 140° C. The brittleness of the resin and its melting temperature can be adjusted in particular by suitably selecting the molecular weight, the composition and the level of cross-linking.

The binding medium resin to be used according to the invention is in this case preferably made up of vinyl monomers. Specific examples for vinyl monomers include: styrene and its derivatives, such as styrene, ortho-methylstyrene, metha-methylstyrene, para-methylstyrene, para-methoxystyrene and para-ethylstyrene; methacrylate esters, such as methyl-methacrylate, ethyl-methacrylate, propyl-methacrylate, n-butyl-methacrylate, isobutyl-methacrylate, n-octyl-methacrylate, dodecyl-methacrylate, 2-ethylhexyl-methacrylate, stearyl-methacrylate, phenyl-methacrylate, dimethylaminoethyl-methacrylate and diethylaminoethyl-methacrylate; acrylates, such as methyl acrylates, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate and phenyl acrylate; derivatives of acrylates and methacrylates, such as acrylnitril, methacrylnitril, and acrylamide. Further examples are provided by dicarboxylic acids with a double bond and their derivatives, such as maleic acid, monobutylmaleate, dibutylmaleate, monomethylmaleate, and dimethylmaleate; vinyl esters such as vinyl acetate and vinyl benzoate vinyl chloride; vinyl ketones such as vinyl methyl ketones or vinyl ethyl ketones; and vinyl ethers such as vinyl methyl ether, vinyl ethyl ether and vinyl isobutyl ether. These monomers can be (co) polymerised either individually or in a mixture of two or more. In this case, it is particularly preferred to use styrene or its derivatives alone or in combination with others of the above monomers, or ester derivatives. Further, polyurethanes, polyamides, epoxy resins, terpene resins, phenolic resins, aliphatic or alicyclic hydrocarbon resins, aromatic petroleum resins, chlorinated paraffines and paraffin waxes may also be suitable.

Several of the above binding medium resins can also be used in combination.

According to the present invention, the ceramic dye composition (toner) can also contain charge control agents and/or agents for improving flowability. Examples for charge control agents are provided by soot, iron black, graphite, nicrosine, metallic complexes of monoazo dyes, Hansa yellow, Benzidine yellow and various paint pigments. The flowability can be improved for example by hydrophobic colloidal silicone dioxide. The above means are preferably added to the toner to the amount of 0.05 to 5 wt %, and in particular 0.2 to 2 wt %.

Further, it is also possible that the toner includes magnetic particles such as iron, manganese, nickel, cobalt and chromium, magnetite, hematite, various ferrites, manganese alloys and other ferromagnetic alloys.

Finally, it is also possible to use a so-called two-component toner which in addition to the ceramic dye pigments, the binding medium resin and possibly the above-mentioned additives, includes carrier particles which can be represented, for example, by iron powder or glass beads.

In the case of the process according to the invention, a paper carrier can preferably be used as a transfer means which is coated with gum arabic, polyvinylacetate or wax. Particularly preferred is a paper carrier coated with gum arabic, as the transfer means can be removed in a very simple manner in this case by moistening with water, the gum arabic being released from the carrier paper, and by subsequently pulling away the carrier paper so that a copied, ceramic dye composition remains on the ceramic or glass article to be printed.

According to the claimed process, the ceramic dye composition is applied onto the transfer means by means of an electrophotographic reproduction process. This process is based on photoelectric and electrostatic effects and is therefore also called an electrostatic copying process.

The above process generally comprises the steps of producing an electrically latent image or charge image on a light-sensitive recording material which generally includes a photoconductive material; subsequent development of the latent image or of the charge image with the applied inventive ceramic dye composition, which acts as a toner; the transfer of the obtained toner image onto an image receiving material (the later transfer means), as for example paper; and the fixing of the toner image, for example by applying heat, pressure or solvent steam, on account of which a copy is obtained. To make the electrically latent images or charge images visible, various development processes are known, for example the magnetic brush process, the cascade development process, the fleece brush process, the powder cloud process, the contact developing process, the spark-over development process and the magnetic dry process. Colored copies are obtained by several successively carried out reproduction steps, several ceramic dye compositions of the corresponding colors (for example cyanogen, magenta, yellow and black) being used. For carrying out the above described electrophotographic reproduction process, a laser printer such as a Canon CLC 350 is very advantageous. In this case, it is favourable to adjust the temperature on the roller to approximately 145 to 150° C. and to adjust the laser power, the discharge corona, the contrast potential and the toner application as high as possible. The optimum process conditions can be optimized by way of simple tests in dependency on the copying apparatus used.

As the ceramic dye compositions used for carrying out the process according to the invention generally have a weak colour intensity, it is advantageous to apply these dye compositions acting as toner with a large thickness onto the transfer means (image receiving material). Usually, the layer thickness of the toner coating consisting of four superimposed dyes in an electric photographic reproduction process, as for example laser printing, is in the range of several hundredths of one millimeter. However, in connection with the process according to the invention, it has proven to be advantageous on account of the color intensity of the ceramic dye compositions to increase the layer thickness of the toner layer to within a range of 0.1 mm–3 mm, preferably 0.3 mm–0.6 mm when four ceramic dye compositions of the appropriate colors (such as cyanogen, magenta, yellow and black) are superimposed one upon the other.

In the case of such a large layer thickness of the toner coating, it is then particularly advantageous to modify the fixing step of a common electrophotographic reproduction process. In the usual copying step, to fix the toner, the image receiving material (such as paper) coated with the toner is pressed with hot fixing rollers in order to bind the toner and the image receiving material (paper) together and to achieve the required gloss. However, in the case of extremely thick toner layers, the color layers can be pressed flat upon pressing with the rollers, and the picture is damaged. Further, it is also possible that the heat during fixing no longer sufficiently penetrates through the thick toner layer so that the toner no longer sufficiently binds together with the image receiving material (subsequently the transfer means), and hollow spaces therefore occur between the toner and the image receiving material, for example paper. In the case of ceramic baking, gases then form beneath these hollow spaces so that bubbles occur and the baked ceramic or glass article becomes faulty. Further, a fixing oil film is often used on the heating rollers during the fixing step in order to be able to cleanly release the fixed material from the rollers. However, this fixing film can hinder the later application of clear lacquer for additionally fixing the dye compositions on the transfer means if it repels the lacquer.

The above-described disadvantageous properties can, however, be prevented if one does not use hot fixing rollers in the electrophotographic reproduction stage, but fixes the toner image produced by means of the ceramic dye compositions after the transfer onto the transfer means without pressure and with application of heat. In this case, the transfer means coated with the ceramic dye compositions can be passed beneath heating radiators or through an oven on a conveyor belt. A temperature of 200° C. as a fixing temperature has proven to be favourable for this.

The mixing ratio between toner and developer is normally approximately 20 wt. % toner for the electrophotographic reproduction process. However, if the ceramic dye compositions are coated with a coating thickness of 0.1 mm or more onto the transfer means, it has proven to be advantageous to adjust the mixing ratio to a range between 30 wt. % to 80 wt. % toner.

By feeding in the data of the desired image to be applied onto the ceramic or glass article by means of a digital color scanner and transferring this data by means of a personal computer to the image memory of the electrophotographic reproduction device, the user is for the first time advantageously provided with the possibility to also carry out changes such as in the color grading or rastering also in the case of very small numbers to be produced. Further, all graphics and/or alterations possible with today's computer technology can be directly transferred onto the transfer means.

In a further advantageous embodiment of the inventive process, the ceramic dye composition can be fixed after application on the transfer means by a clear lacquer which upon baking burns away without leaving any residue. In this manner, it is prevented that the ceramic dye composition is rubbed away or damaged in any other way upon placement of the transfer means on the ceramic or glass article.

The finalizing baking step taking place after removal of the transfer means ensues generally at a temperature in the range of 800 to 1500° C. in dependency on the material of the ceramic or glass article.

It is possible with the above described process according to the invention to overcome the disadvantages of the screen printing process existing in the state of the art. The cleaning of the screen printing patterns previously necessary and the use of solvents involving the known disadvantages is no longer required. Large air conditioning units and protective devices for the workers are no longer necessary and it is therefore also possible for the first time, for example, to decorate plates, porcelain articles or other articles according to the wishes of the customer on a color copier operating with the ceramic composition (toner) according to the invention.

Further, in the case of the process according to the invention, the desired image to be applied can be produced independently of the scale of manufacture in a very inexpensive manner. The costs for producing large series are greatly reduced, as for example in the case of tile manufacture. Even in the case of very small scale manufacture is it now possible to make various changes, such as in the color selection or rastering, as the image is processable in the computer and no extra new patterns need to be manufactured. On account of this, the process according to the invention is considerably simpler and cheaper than the known processes.

The invention further includes decorated ceramic and glass articles obtainable according to the above described process. These distinguish themselves in comparison to the articles obtained by means of the known screen printing process (or offset printing process) by the following properties: The image surfaces appear very smooth, homogenous and unrastered. In comparison to the known printed articles, a greater fineness, smoothness and resolution is achieved.

Finally, the invention relates to a ceramic dye composition including fine particles which can respectively comprise ceramic pigments, binding medium resin(s) and possibly further additives such as charge control agents and flowability improving agents, carrier materials and/or magnetic particles.

The ceramic pigments are preferably compounds of the spinel type or of the zirconium silicate type.

The binding medium resin includes the properties that it burns without leaving any residue, a sufficient elasticity in order to bind the appropriate pigment quantity and it does not break upon crushing (pulverizing) the mixture of pigment and resin, and preferably has a melting point of approximately 140° C. The two latter properties in particular can be adjusted by way of the molecular weight, the composition and the level of cross-linking.

The binding medium resin is preferably composed up of one or more vinyl monomers, and particularly comprises polymers or copolymers of styrene or derivatives thereof, or also ester derivatives.

The weight proportion of the ceramic colored pigment in the ceramic dye composition preferably amounts to 10 to 70%, and the particle size of the ceramic dye composition lies advantageously between 1 and 50 μm and particularly preferably at approximately 5 μm. The particles also advantageously have a core of ceramic pigments which is encased by binding medium resin(s).

For further explanation and better understanding of the invention, an embodiment is described in more detail in the following with reference to the enclosed drawings.

Figure 2:
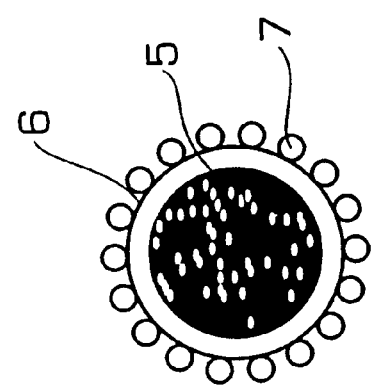

FIG. 1: Flowchart of the inventive process;

FIG. 2: Structure of a particle of the ceramic dye composition according to the invention.

A schematic depiction of a flowchart of the inventive process is shown in FIG. 1. A scanner (1) such as DC 3000 bright is connected to a personal computer (2), for example an Apple Quadra 950, by means of a data line. This personal computer (2) itself is connected by means of a further data line to a color laser printer (4) which includes an image storing device (3), IPU. A Canon CLC 350 can be mentioned as an example of a color laser printer (4).

The image depiction, which already exists for example as a photograph, to be applied onto a ceramic or glass article, such as a plate, is recorded by means of the scanner (1). The corresponding data are transferred from the scanner (1) to the personal computer (2) and can possibly be changed in this according to the wishes of the user. These changes can relate to the color, the color grading, image section changes and much more besides. Once an appropriate image has been designed, the data are transferred to the color laser printer (4) through the date line. The color laser printer (4) includes one or more ceramic dye compositions of the inventive kind. In accordance with the pattern produced in the personal computer (2), a sheet of paper coated with gum arabic is successively coated with the various ceramic dye compositions by means of electrophotographic reproduction. According to FIG. 2, the particles of the ceramic dye compositions consist of a pigment core (5), a binding medium resin casing (6) and charge control agent (7). After this, a clear lacquer is applied onto the ceramic dye compositions coated onto the gum arabic so that these are protected against being wiped away or damaged. The paper provided with ceramic dye compositions is laid or applied in the desired manner on the appropriate ceramic or glass article, such as a plate. By moistening the paper, this is released from the layer of gum arabic and can be easily pulled off the ceramic or glass article so that only the ceramic dye compositions remain on the article.

Subsequently, the article with the ceramic dye compositions applied in the desired manner is baked in an oven in a known manner so that the colors amalgamate with the upper surface of the article. The printed plate obtained by means of this process has a decoration which is excellent in terms of its homogeneity, smoothness and resolution.

I claim:

1. A ceramic dye composition consisting of fine particles of ceramic pigments, a binding medium resin and optionally one or more additives selected from the group consisting of a charge control agent, a flowability improving agent, carrier particles and magnetic particles, wherein said ceramic dye pigments have a weight portion in an amount of from 10–70%, and the binding medium resin is solid at room temperature.

2. The ceramic dye composition according to claim 1, wherein said ceramic pigments are pigments of the spinel type or of the zirconium silicate type.

3. The ceramic dye composition according to claim 1, wherein said binding medium resin is composed of one or more vinyl monomers.

4. The ceramic dye composition according to claim 2, wherein said binding medium resin is composed of one or more vinyl monomers.

5. The ceramic dye composition according to claim 3, wherein said binding medium resin comprises one or more vinyl monomers selected from the group consisting of styrene, ortho-methylstyrene, meta-methylstyrene, para-methylstyrene, para-methoxystyrene, para-ethylstyrene, methyl-methacrylate, ethyl-methacrylate, propyl-methacrylate, n-butyl-methacrylate, isobutyl-methacrylate, n-octyl-methacrylate, dodecyl-methacrylate, 2-ethylhexyl-methacrylate, stearyl-methacrylate, phenyl-methacrylate, dimethylaminoethyl-methacrylate, diethylaminoethyl-methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chlorethyl acrylate, phenyl acrylate, acrylnitril, methacrylnitril, acrylamide, maleic acid, monobutylmaleate, dibutylmeate, monomethylmaleate, dimethylmaleate, vinyl chloride, vinyl acetate, vinyl benzoate, vinyl methyl ketone, vinyl ethyl ketone, vinyl methyl ether, vinyl ethyl ether, and vinyl isobutyl ether.

6. A ceramic dye composition according to claim 1, wherein said ceramic pigments form particle cores which are encased by said binding medium resin.

7. The ceramic dye composition according to claim 1, wherein the particle size of said ceramic dye composition is from 1 to 50 μm.

* * * * *